United States Patent
Russ

(10) Patent No.: US 9,673,740 B2
(45) Date of Patent: Jun. 6, 2017

(54) DETERMINING A ROTOR OFFSET

(71) Applicant: Ronald Paul Russ, Farmington Hills, MI (US)

(72) Inventor: Ronald Paul Russ, Farmington Hills, MI (US)

(73) Assignee: Visteon Global Technologies, Inc., Van Bruen Township, MI (US)

( * ) Notice: Subject to any disclaimer, the term of this patent is extended or adjusted under 35 U.S.C. 154(b) by 0 days.

(21) Appl. No.: 14/876,109

(22) Filed: Oct. 6, 2015

(65) Prior Publication Data

US 2017/0099021 A1 Apr. 6, 2017

(51) Int. Cl.
*H02P 8/00* (2006.01)
*H02P 8/08* (2006.01)
*H02P 8/22* (2006.01)

(52) U.S. Cl.
CPC . *H02P 8/08* (2013.01); *H02P 8/22* (2013.01)

(58) Field of Classification Search
CPC .......................................................... H02P 8/22
USPC ............................ 318/696, 400.21, 430, 431
See application file for complete search history.

(56) References Cited

U.S. PATENT DOCUMENTS

| | | | |
|---|---|---|---|
| 6,861,817 B2 * | 3/2005 | Pigott | H02P 8/08 318/560 |
| 7,170,254 B2 * | 1/2007 | Yamada | G01R 7/06 318/434 |
| 9,013,133 B2 * | 4/2015 | Russ | H02P 8/22 318/400.21 |
| 2012/0304914 A1 | 12/2012 | Russ | |

* cited by examiner

*Primary Examiner* — David S Luo
(74) *Attorney, Agent, or Firm* — Dickinson Wright PLLC

(57) ABSTRACT

A system and method for determining a microstep rotor offset of a stepper motor is provided. The system includes a microcontroller configured to control voltage applied to a first coil and a second coil provided to operate the stepper motor; a back electro-magnetic force (BEMF) detection circuit configured to detect BEMF generated from the stepper motor. The stepper motor drives a pointer with a pointer stop, and the system is configured to: 1) home the stepper motor to the pointer stop, and 2) perform an iterative operation to determine a specific microstep associated with the microstep rotor offset.

8 Claims, 8 Drawing Sheets

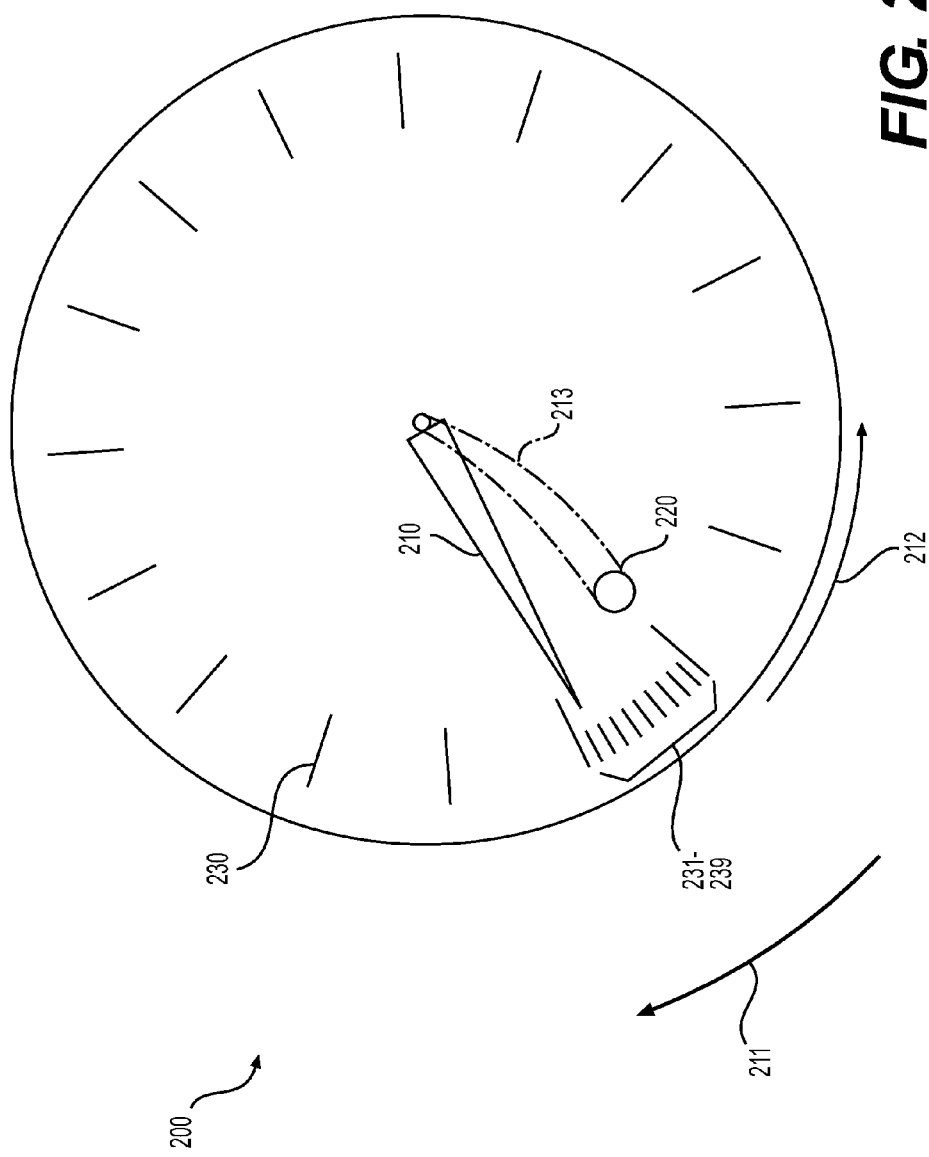

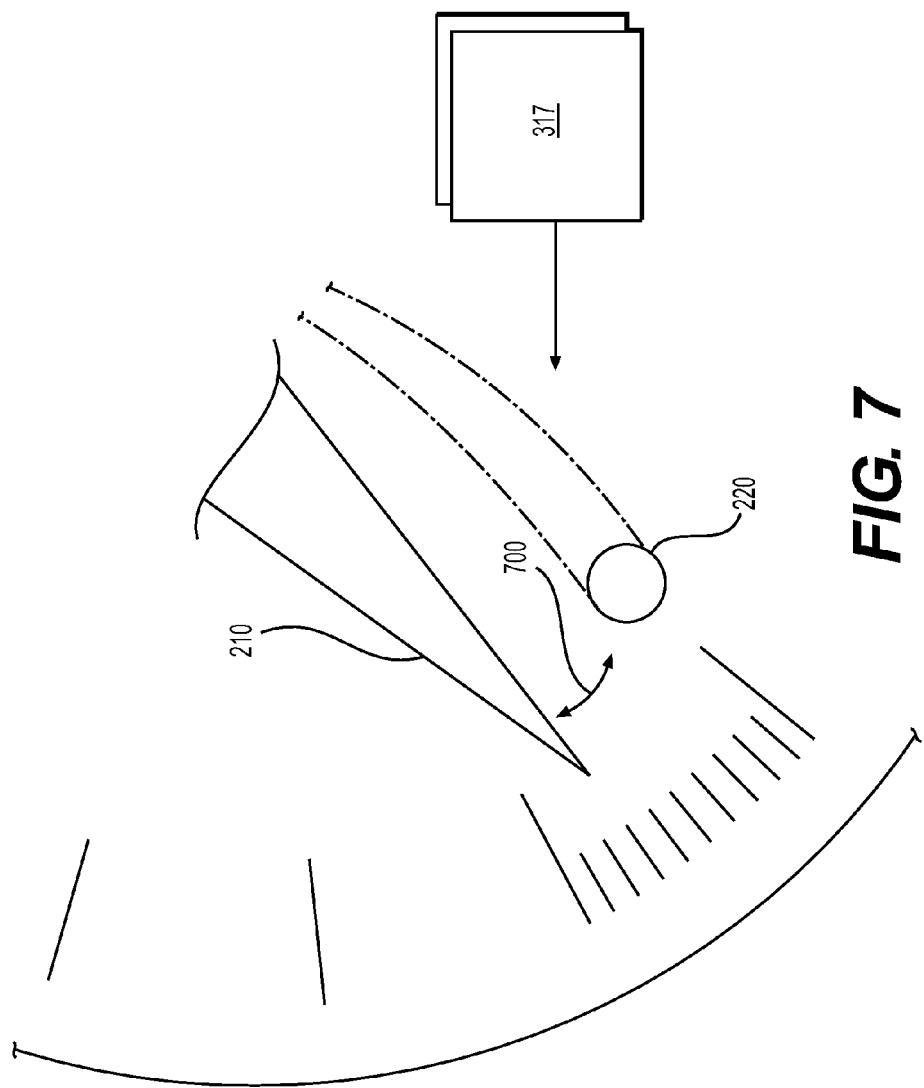

DETERMINING A ROTOR OFFSET

BACKGROUND

Displays may receive information from a central processor or sensor, and translate the information in a manner that a viewer prefers. In certain cases, the displays are digital or analog, or a combination of both.

One such widely implemented display is a pointer. A pointer is often driven by a motor in a manner to rotate from a first position to a second. The motor is electrically driven by a certain predefined amount, with the rotation corresponding to a specific value or indicia. Thus, when the tip of the pointer points at a specific value, the pointer is indicating a current or recent state associated with a machine.

Pointers driven by motors are commonly implemented in vehicles. A pointer device receives information from a vehicle sensor, for example, a speed sensor, a fuel sensor, an engine sensor, or the like—and translates the received information into a specific value to point at.

Different motors have been implemented for this application. One such motor is the stepper motor. The stepper motor is a brushless direct current (DC) electric motor that divides a full rotation into a number of equal steps.

Various implementations of stepper motors have been realized, based on the operation and other aspects. One such implementation is a stepper motor that uses a microstep. The microstep is defined as a stepper motor that employ microstepping (or "sine cosine microstepping"). The microstepping may employ a sinusoidal alternating current (AC) waveform. One justification for employing microstepping is that a finer resolution of step size may be achieved. Thus, a full rotation may provide more distinct step positions versus other type of stepper motors.

In order to calibrate a microstep motor, an offset is determined. Knowing the offset allows for a more accurate implementation of the motor. Each microstep motor may have an individual offset caused by variations in the motor properties, such as magnets, materials, and other factors. Thus, if a specific microstep motor's offset is known, the operation or driving of the microstep motor may be adjusted based on the known offset for a more accurate and calibrated performance.

FIG. 1(a) shows a stepper motor 10 according to the prior art. As shown, the stepper motor 10 includes a first conductive core 12, a second conductive core 14, first inductive coil 16, a second inductive coil 18, and a permanent magnet 20. It is understood that the stepper motor 10 may include any number of conductive cores and coil windings, as desired.

The first conductive core 12 may be formed from any conductive material such as metal, for example. The first conductive core 12 is disposed adjacent the permanent magnet 20, wherein the permanent magnet 20 is free to rotate. As shown, the first conductive core 12 includes a first conductive core aperture 22, the permanent magnet 20 disposed therein. Although the first conductive core 12 is shown having a rectangular shape, it is understood that the first conductive core 12 may have any shape and size, as desired.

The second conductive core 14 may be formed from any conductive material such as metal, for example. The second conductive core 14 is disposed adjacent the permanent magnet 20, wherein the permanent magnet 20 is free to rotate. As shown, the second conductive core 14 includes a second conductive core aperture 24, the permanent magnet 20 disposed therein. Although the second conductive core 14 is shown having a rectangular shape, it is understood that the second conductive core 14 may have any shape and size, as desired.

The first inductive coil 16 may be formed from any conductive material such as metal, for example. The first inductive coil 16 includes a first inductive coil first lead 26 and a first inductive coil second lead 28. Each lead 26, 28 is adapted for electrical communication with a source of electrical energy (not shown). The first inductive coil 16 is wound around at least a portion of the first conductive core 12. It is understood that the first inductive coil 16 may have any number of turns or windings.

The second inductive coil 18 may be formed from any conductive material such as metal, for example. The second inductive coil 18 includes a second inductive coil first lead 30 and a second inductive coil second lead 32. Each lead 30, 32 is adapted for electrical communication with a source of electrical energy. The second inductive coil 18 is wound around at least a portion of the second conductive core 14. It is understood that the second inductive coil 18 may have any number of turns or windings.

The permanent magnet 20, also referred to as a magnetic rotor, is shown as a magnetic disk having a first magnetic pole 34 and a second magnetic pole 36. It is understood that the permanent magnet 20 may have any shape, as desired. It is further understood that the permanent magnet 20 may have any number or orientation of magnet poles, as desired. The permanent magnet 20 is disposed adjacent the first conductive core 12 and the second conductive core 14. The permanent magnetic 20 further includes a rotor shaft 38 having an axis 37, the rotor shaft 38 adapted to control the rotational motion of a secondary device such as an instrument pointer, for example.

FIG. 1(b) shows a programmable control system 40 in electrical communication with a stepper motor 10 according to a prior art implementation. The programmable control system 40 includes a plurality of programmable control system inputs 42, a control unit 44, and a detector device 46.

The plurality of programmable control system inputs 42 is adapted to receive an electrical signal such as a sinusoidal or triangular voltage waveform, for example. As shown, the programmable control system inputs 42 are in electrical communication with the stepper motor 10. Although the programmable control system 40 is shown having four programmable control system inputs 42, it is understood that the programmable control system 40 may have any number of programmable control system inputs 42, as desired.

The control unit 44 includes a drive circuit 48, a rectification device 50, and an integrator device 52. The drive circuit 48 is in electrical communication with the plurality of electrical leads 26, 28, 30, 32 of the stepper motor 10. The drive circuit 48 is adapted to provide an electric current to the stepper motor 10. It is understood that the drive circuit 48 may provide electrical communication between the electrical leads 26, 28, 30, 32 of the stepper motor 10 and the source of electrical energy. The rectification device 50 is in electrical communication with the programmable control system inputs 42. The rectification system 50 may be any conventional system for rectifying an electric signal and providing an output signal having a single polarity such as multiplexer circuitry, for example. The integrator device 52 is in electrical communication with the rectification device 50 and the detector device 46. It is understood that the integrator device 52 may be any conventional device, wherein an output signal 53 of the integrator device 52 is proportional to the integral of an input signal of the integrator device 52 such as an operation amplifier integrator, for example.

The detector device 46 includes a detector input 54 and a detector output 56. It is understood that the detector device 46 may be any conventional device for receiving an electrical signal, measuring the electrical signal, and transmitting an output relating to the signal measurement such as a microcomputer, for example. The detector device 46 may further include a programmable function, wherein the function provides measurement and analysis of characteristics of the stepper motor 10 such as rotational velocity and accumulated back EMF, for example. The detector input 54 is in electrical communication with the integrator device 52 of the control unit 44. The detector output 56 is in electrical communication with a feedback loop 58. The detector output 56 is adapted to transmit an output signal 57 of the detector device 46 to the feedback loop 58. As shown, the feedback loop 58 is in electrical communication with the control unit 44, specifically, the drive circuit 48. It is understood that the output signal 57 of the detector device 46 may be transmitted to the drive circuit 48, wherein the output signal 57 is received by the drive circuit 48 to control the rotation of the stepper motor 10. It is further understood that the output signal 57 of the detector device 46 may be transmitted to a display device (not shown), wherein a user may analyze and interpret the output signal 57.

In operation, the drive circuit 48 provides an effective voltage across the first inductive coil 16, wherein the voltage causes an electric current to flow through the first inductive coil 16. As the change in electric current occurs, a magnetic field is induced within the first inductive coil 16. The magnetic field is channeled through the first conductive core 12 toward the permanent magnet 20. When the magnetic field from the first inductive core 16 and the magnetic field from the permanent magnet 20 are not aligned, the permanent magnet 20 will rotate about the axis 37 of the rotor shaft 38. Because opposite magnetic fields attract and like fields repel each other, this rotation continues until the magnetic fields of the permanent magnet 20 have aligned with the opposite pair of magnetic fields from the first inductive coil 16. After the permanent magnet 20 has rotated into the new position, it settles and stops moving. It is understood that to keep the permanent magnet 20 rotating, the magnetic field from both the first inductive coil 16 and the second inductive coil 18 must be changed periodically in a sequence with alternating magnetic fields that keep the permanent magnet 20 in an unstable state and rotating in a desired direction.

Conventionally, microstep motor offsets are determined by experimental or observational techniques. Thus, during production, a microstep motor offset may be viewed or observed, with the offset being recorded by the viewer. However, this technique may not be accurate and/or efficient.

SUMMARY

The following description relates to determining a microstep rotor offset. Exemplary embodiments may also be directed to the system and method for performing the same.

A system for determining a microstep rotor offset of a stepper motor is provided. The system includes a microcontroller configured to control voltage applied to a first coil and a second coil provided to operate the stepper motor; a back electro-magnetic force (BEMF) detection circuit configured to detect BEMF generated from the stepper motor. The stepper motor drives a pointer with a pointer stop, and the system is configured to: 1) home the stepper motor to the pointer stop, and 2) perform an iterative operation to determine a specific microstep associated with the microstep rotor offset.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which:

FIG. 2 illustrates an example of a pointer implementation according to an exemplary embodiment.

FIG. 7 illustrates an example implementation of the system in a pointer calibration.

DETAILED DESCRIPTION

Figure 1A:
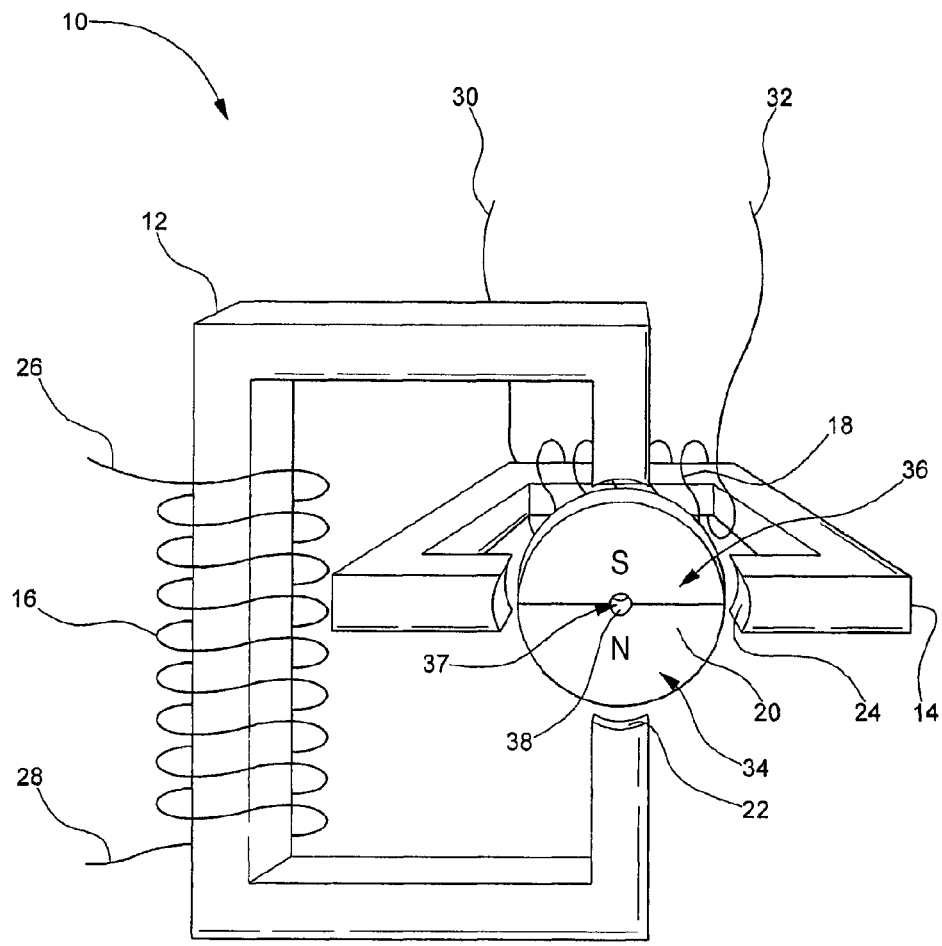
FIG. 1(a) shows a stepper motor 10 according to the prior art.
Figure 1B:
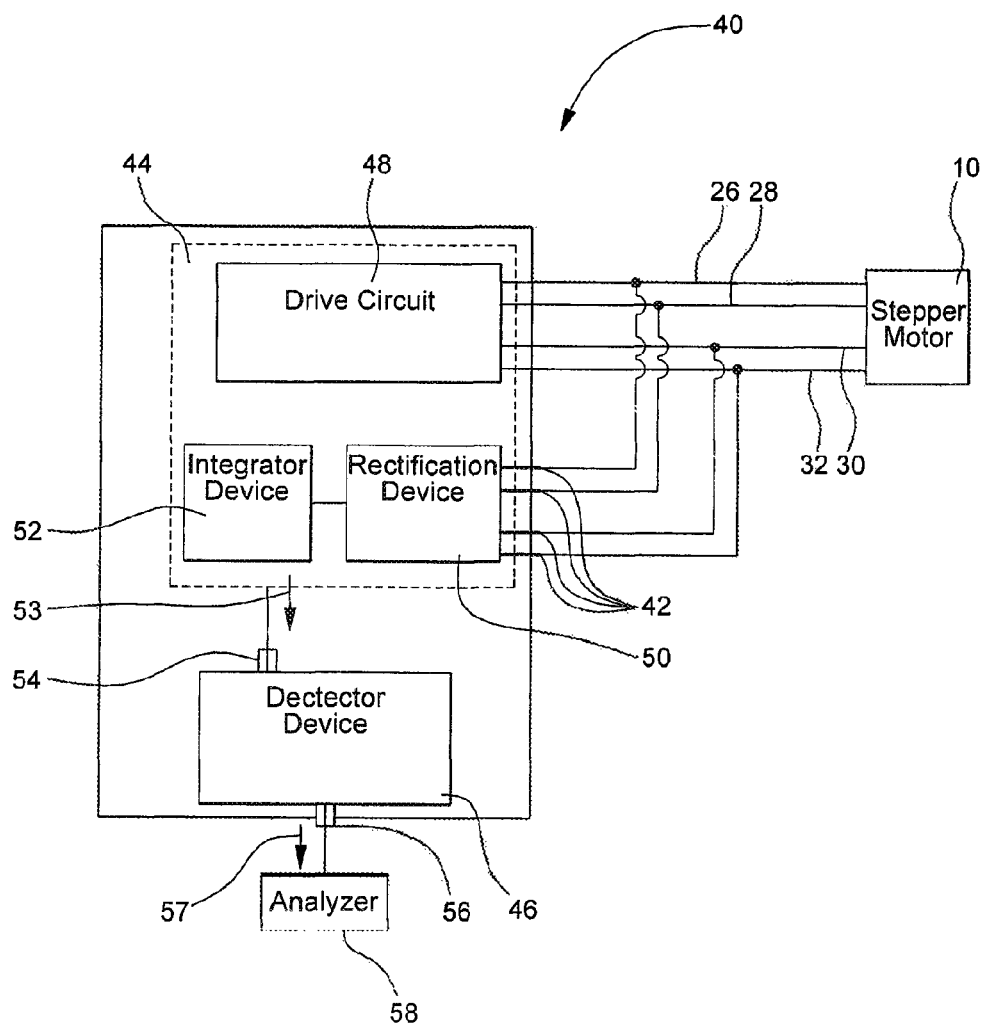
FIG. 1(b) shows a programmable control system 40 in electrical communication with a stepper motor 10 according to a prior art implementation.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Microstep motors provide a granular stepper motor operation, with the granularity being translated to a display operation. For example, the microstep motors may be attached to a pointer, with the pointer being employed to point at various indicia on a pointer display.

Various concerns and issues become apparent when attempting to implement a microstep motor, for example, in the context described above. The microstep motor should be accurate, responsive, and provide enough granularity for an operation associated the motor is associated with.

One such technique to improve accuracy is to be cognizant of a microstep motor's offset. The offset (or microstep flip) is the number of microsteps away from a resting position. Thus, if the microstep is stopped or put in a rest position, the offset/flip indicates the amount of microsteps the stepper motor 10 may be off center. Thus, if this amount is known, when the stepper motor is affixed to an object, for example a pointer, the stepper motor may be microstepped at rest position a specific amount to ensure the pointer is placed at a zero position.

FIG. 2 illustrates an example of a pointer implementation 200 according to an exemplary embodiment. The pointer implementation 200 is provided with all the elements shown in FIGS. 1(a) and (b), which are not shown in FIG. 2. For example, the elements of FIGS. 1(a) and (b), and specifically the stepper motor implementation may be attached to the pointer via a stem or rod, and situated behind the pointer implementation 200. The pointer implementation 200 includes a pointer 210, a pointer stop 220, and a various indicia 230. The pointer 210 is driven by a stepper motor 10. Thus, rotations via the stepper motor 10 may be translated to the pointer 210 based on a signal (i.e. a control signal) from the microcontroller.

Also shown in FIG. 2 is the two directions the pointer 210 is capable of moving (clockwise 211 and counter-clockwise 212). Depending on the electrical signal onto the supply lines of the stepper motor 10, the pointer 210 may move in one direction or the other.

Also shown at the pointer stop 220 is the outline of the pointer 210 (213) when it makes contact with the pointer stop 220. As shown, the pointer 210 is impeded from moving more in a counter-clockwise direction 212. However, the pointer 210 is slightly bent (outline 213).

Also shown in FIG. 2 is a variety of microsteps 231-239. The number of microsteps shown is for explanatory purposes. Thus, an implementer of a stepper motor may choose the microsteps based on the motor and driving technology provided.

Figure 3:
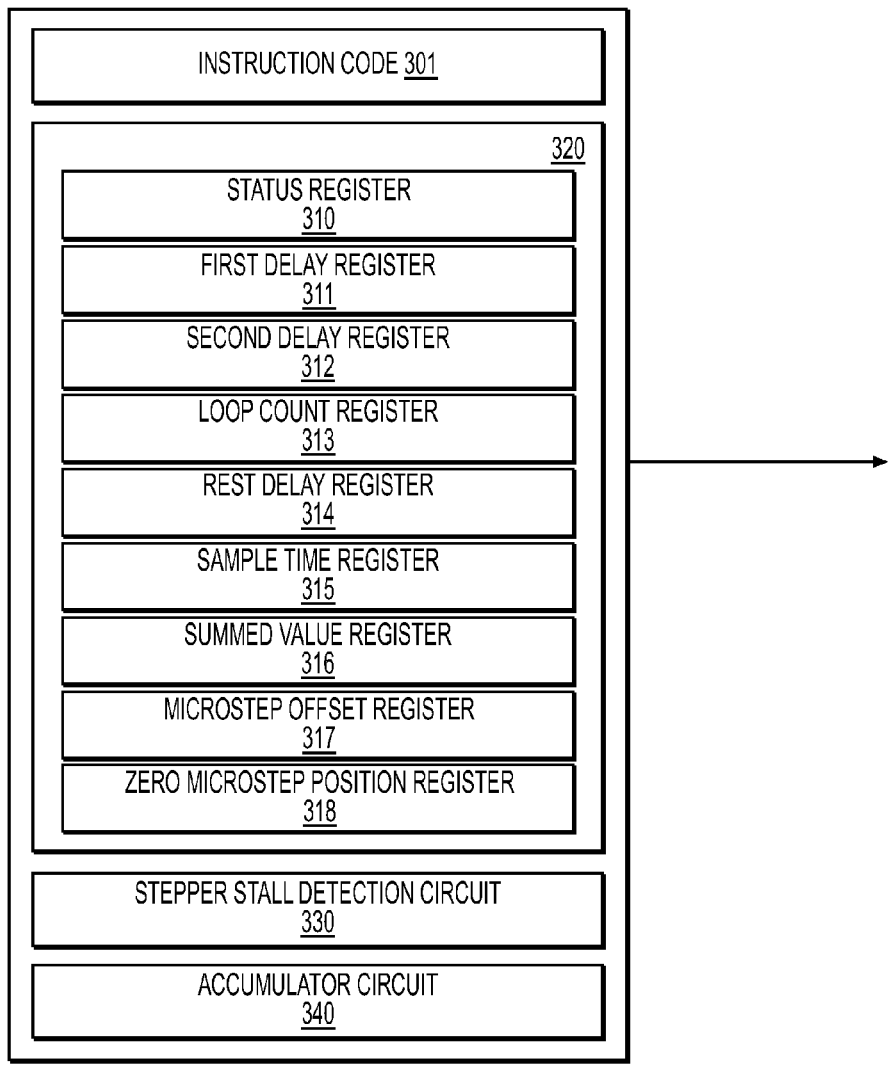
FIG. 3 illustrates an example implementation of a system for detecting a flip associated with a stepper motor.

Not shown in FIG. 2 is system 300. FIG. 3 illustrates an example implementation of a system 300 for detecting a flip associated with a stepper motor 10.

The system 300 is configured to interface with the control unit 44 to control signals being communicated to the stepper motor 10, and to detect signals received from the stepper motor 10.

The system 300 may be provided as a stand-alone component, or alternatively, may be integrated into the control unit 44 (not shown). Thus, the control unit 44's operation may be modified to include the elements of system 300. The control unit 44 may be incorporated with a programmable device (for example, a microcontroller), capable of operating the stepper motor 10.

The system 300 includes various registers (registry element 320) to store information, and aid in the detection. The registers may be any known memory (volatile or non-volatile) employed to store information. The registers are shown in FIG. 3 and will be explained in greater detail further below.

Figure 4:
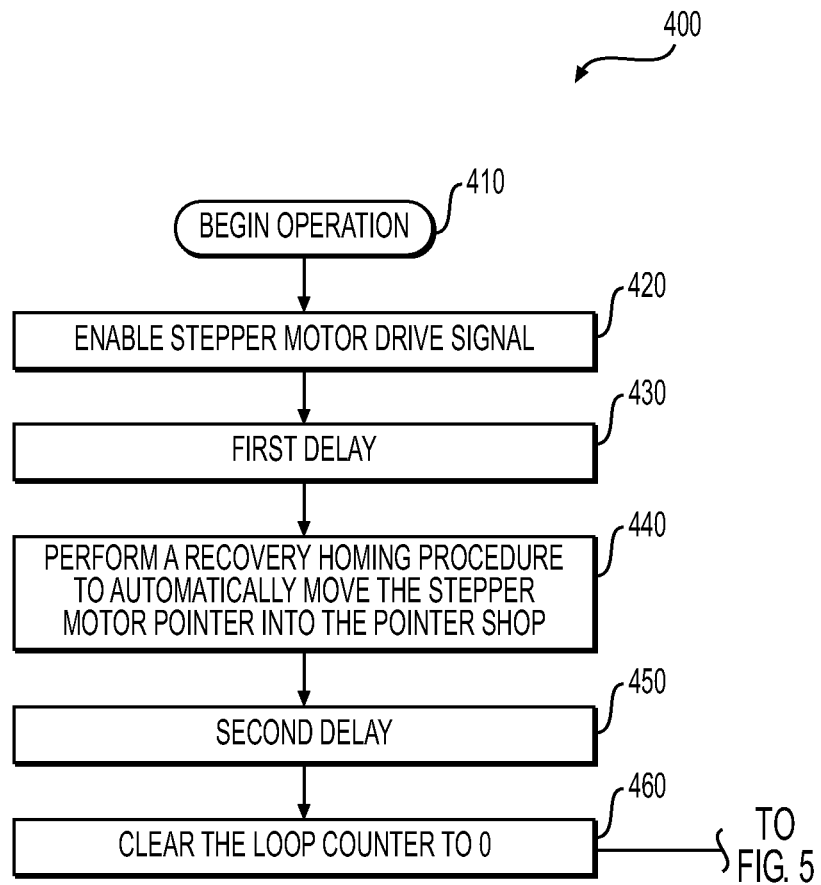
FIG. 4 illustrates an example of a method for moving the pointer to the pointer stop.
Figure 5:
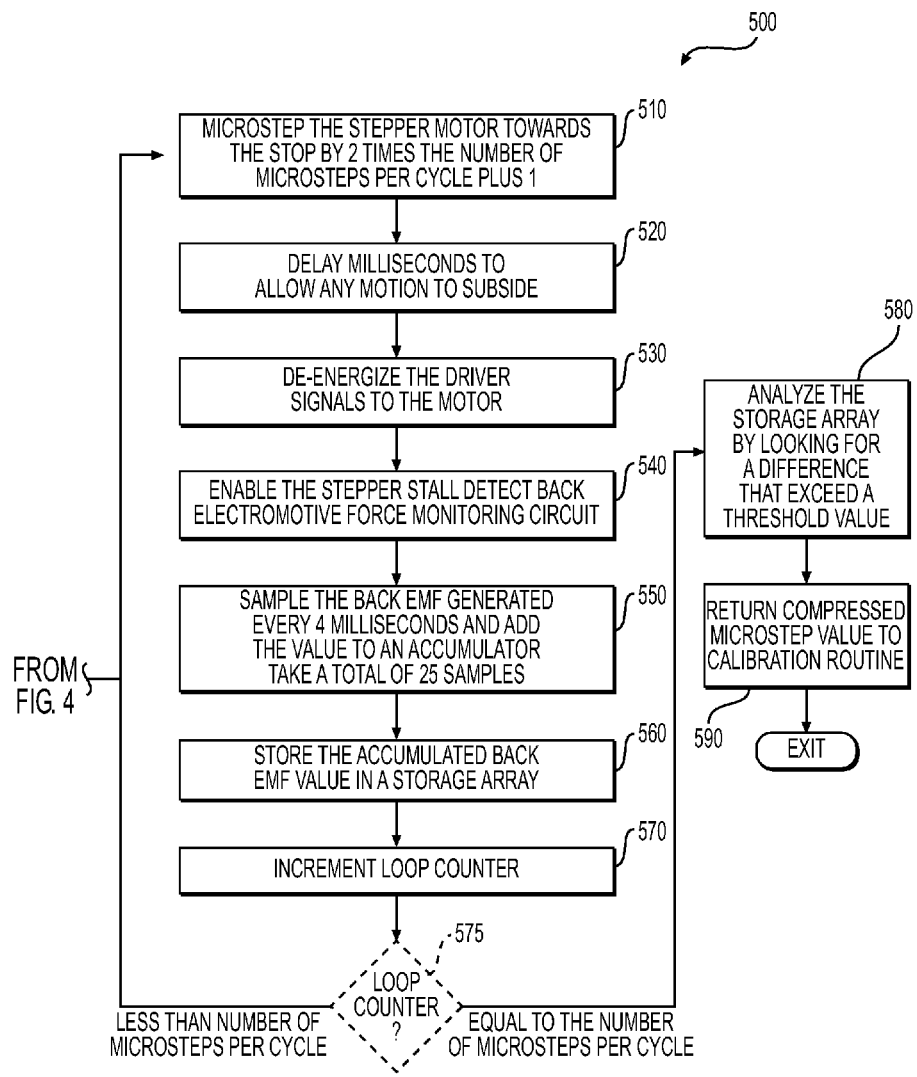
FIG. 5 illustrates an example of a method for detecting the flip microstep.

The system 300's operation is facilitated by the operations described in FIGS. 4 and 5. FIG. 4 illustrates an example of a method 400 for moving the pointer 210 to the pointer stop 220. FIG. 5 illustrates a method 500 for detecting the flip microstep.

In operation 410, the method 400 receives an indication to begin operation. The registers shown in FIG. 3 are all cleared and initialized.

In operation 420, a status register 310 may be initially set to "NOT COMPLETE". The status register 310 stores an indication that the flip has not been detected. In operation 430, the stepper motor 10 is enabled and moved (i.e. an electrical signal is propagated to coils 16 and 18).

In operation 430, a 'FIRST DELAY' register 311 is cross-referenced to allow the power sources associated with power coils 16 and 18 to power up. The 'FIRST DELAY' may be set to 200 milliseconds (ms); however, the amount of the delay is configurable by an implementer of system 300.

In operation 440, the stepper motor 10 is instigated to perform a recovery homing procedure, via instructions provided by the microcontroller 110. The recovery homing procedure automatically moves the stepper motor 10 to microstep the pointer 210 to the pointer stop 220.

In operation 450, a 'SECOND DELAY' register 312 is cross-referenced, and the system 300 is delayed by the amount of time stored in 'SECOND DELAY' register 312. In one example, the 'SECOND DELAY' register 312 may be set to 200 ms.

In operation 460, a 'LOOP COUNT' register 313 is initialized. And set to zero. As shown, method 400 includes a line that proceeds to method 500. FIG. 5 illustrates an example of a method 500 for determining a flip associated with stepper motor 10. As explained above, methods 400 and 500 may be integrally provided to explain the operation of system 300.

In operation 510, the pointer 210 is rotated in the direction towards the stop (either clockwise 211 or counter-clockwise 212) depending on the definition of movement for the pointer 210 desired.

The number of microsteps moved may be a predefined number. In one example, the predefined number is defined by the microsteps per cycle, multiplied by 2, and with one additional microstep added. The added microstep ensures that the pointer 210 is pressed against the stopper 220.

In operation 520, a delay is introduced by a factor retrieved from a 'REST DELAY' register 314. The 'REST DELAY' register 314 allows for the pointer 210 to settle, and thus, extinguish any motion associated with operation 510. In one example, the 'REST DELAY' register 314 is defined as 20 ms.

In operation 530, the energy supplied to the coils 16 and 18 is turned-off. Essentially, the microcontroller communicates a signal to an element or circuit driving the coils 16 and 18, thus opening the connection to the coils 16 and 18.

In operation 540, a stepper stall detection circuit 330 is enabled. The stepper stall detection circuit 330 is electrically coupled to the stepper motor 10, via a supply line employed to the drive the stepper motor. The stepper stall detection circuit 330 is configured to measure the BEMF generated by the stepper motor 10.

In operation 550, the BEMF is sampled periodically for a predefined time, 'SAMPLE TIME' register 315. Although not shown, the detection of the BEMF may be performed by a BEMF detection circuit. The BEMF detection circuit is provided to detect BEMF produced via the coils of the stepper motor 10. The 'SAMPLE TIME' register 315 is defined, in one example, as 4 ms. The detected BEMF is stored in an accumulator circuit 340. The accumulator circuit 340 adds the various sampled BEMF values together. The number of samples taken corresponds to the value of microsteps taken in operation 510.

In operation 560, the values summed in operation 550 is stored in a 'SUMMED VALUE' register 316. As explained below, the 'SUMMED VALUE' register 316 may store a value for iterative performance of method 500. In addition, the 'LOOP COUNT' register 313 is stored in a manner that allows for cross-reference and recall of the corresponding 'SUMMED VALUE' register 316.

In operation 570, the 'LOOP COUNT' register 313 is incremented by 1. In operation 575, a determination is made if the 'LOOP COUNT' register 313 is equal to the number of microsteps per electrical cycle taken. If yes, the method 500 proceeds to operation 580. If no, the method 500 proceeds to operation 510.

In operation 580, the data accumulated from the 'SUMMED VALUE' register 316 is analyzed. The purpose of the analysis done in operation 580 is to determine the microstep rotor offset 317. This value is used in a calibration operation 590.

Figure 6:
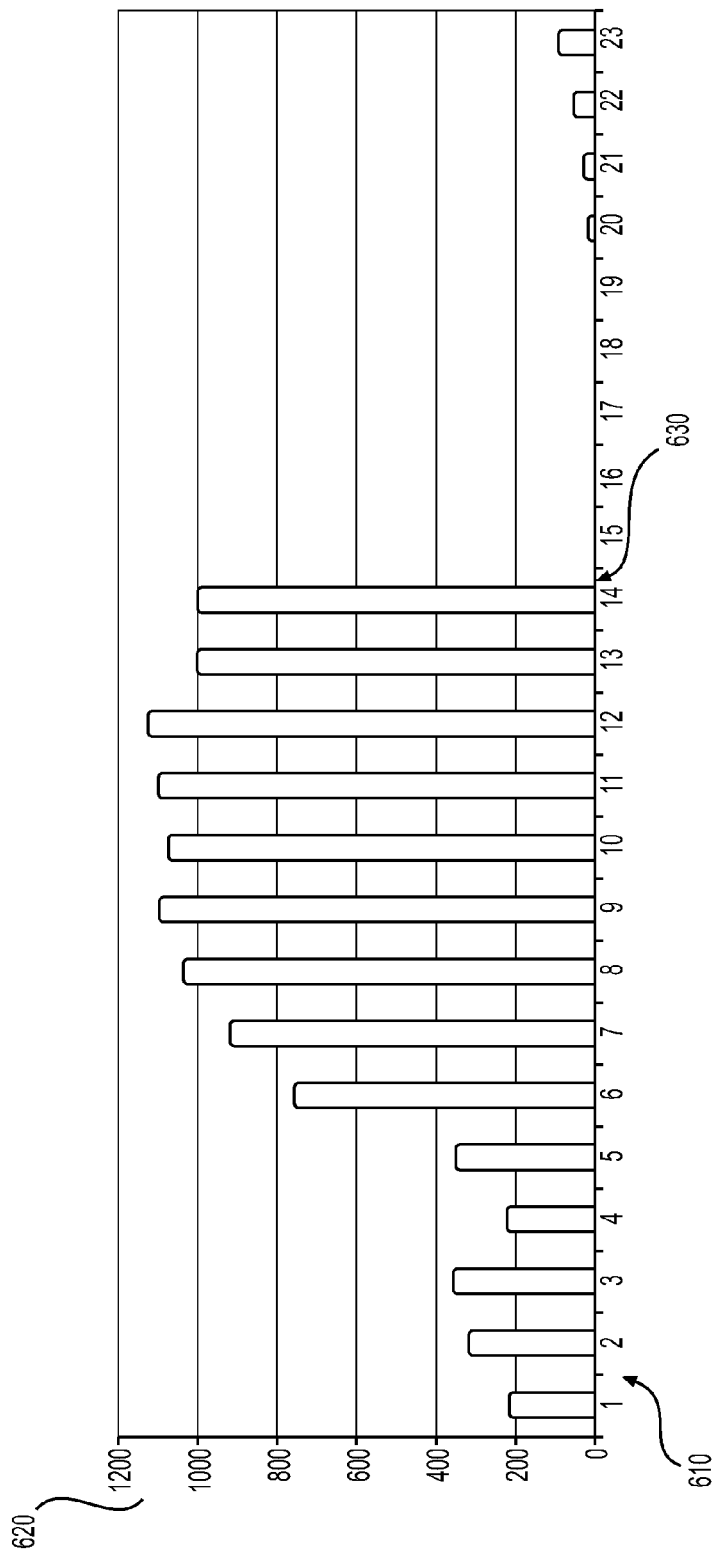
FIG. 6 illustrates and example graph of an implementation of system.

FIG. 6 illustrates and example graph 600 of an implementation of system 300. In the example shown, there are 24 iterations of method 500 performed, with the x-axis 610 corresponding to each iterative step of method 500 which is the accumulated BEMF for each of the 24 microsteps, and the y-axis 620 corresponding to the 'SUMMED VALUE' register 316 for the specific step. As illustrated in graph 600 the microstep rotor offset is determined by analyzing the BEM values between adjacent microsteps, and in this example the greatest difference between microstep 14 and 15. Thus, the value of 14 (corresponding to microstep 14), may be identified as the MICROSTEP OFFSET register 317.

Once the MICROSTEP OFFSET register 317 is set, the value can be used in determining the zero microstep position of stepper motor 10. Thus, when the stepper motor 10 is being initialized, i.e. coils 16 and 18 are energized, the MICROSTEP OFFSET register 317 value plus a known constant are calculated and used as the initial zero pointer microstep position (ZERO MICROSTEP POSITION register 318). This calibrated zero microstep position allows the pointer to be energized and de-energized against the pointer stop with no visible motion.

FIG. 7 illustrates an example implementation of the system 300 in a pointer calibration. As shown, the pointer 210 receives the zero microstep position based upon the MICROSTEP OFFSET register 317 and a constant. This value is then translated an 'X' 700 microsteps away from the pointer stop 220. Thus, every time the pointer 210 is initialized, the stepper motor 10 is set to the value contained in the ZERO MICROSTEP POSITION register 318.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

I claim:

1. A system for determining a microstep rotor offset of a stepper motor, comprising:
    a microcontroller configured to control voltage applied to a first coil and a second coil provided to operate the stepper motor;
    a back electro-magnetic force (BEMF) detection circuit configured to detect BEMF generated from the stepper motor, wherein
    the stepper motor drives a pointer with a pointer stop, and the system is configured to:
        1) home the stepper motor to the pointer stop, and
        2) perform an iterative operation to determine a specific microstep associated with the microstep rotor offset,
    wherein homing the stepper motor further comprises:
    enabling the stepper motor's drive signal;
    introducing a first delay to allow a first power coil and a second power coil to power up;
    moving the pointer to the pointer stop via a homing instruction received via the microcontroller;
    introducing a second delay after the moving; and
    initializing a loop counter register.

2. The system according to claim 1, wherein the determining further comprises:
    microstepping the stepper motor towards the pointer stop two times a microstep per cycle (a sample number);
    microstepping the stepper motor one additional microstep;
    introducing a third delay;
    de-energizing the stepper motor's drive signal;
    enabling a stepper motor stall detect back electromotive force (BEMF) monitoring circuit, the BEMF monitoring circuit being configured to record the BEMF produced via the stepper motor;
    sampling, via the BEMF monitor circuit, for a predetermined time amount and a predetermined sample amount.

3. The system according to claim 2, further comprising incrementing the loop counter register after the sampling by 1.

4. The system according to claim 3, further comprising determining whether the loop counter register is equal to the sample number, and if no, performing the iterative step again, and if yes, performing an operation to establish the microstep rotor offset.

5. The system according to claim 4, wherein the operation to establish the microstep rotor offset further comprises:
    analyzing a storage array of the sampled amount generated by the BEMF monitoring circuit; and
    in response to a corresponding sampled amount for a specific cycle being searched through the array of stored accumulated BEMF values corresponding to each microstep for a greatest adjacent difference, establishing the specific cycle as the microstep rotor offset.

6. The system according to claim 5, wherein the microstep rotor offset is communicated to the microcontroller, and the microcontroller is configured to apply the microstep rotor offset while zeroing the pointer.

7. A method for determining a microstep rotor offset of a stepper motor, comprising:
    enabling the stepper motor's drive signal;
    introducing a first delay to allow a first power coil and a second power coil to power up;
    moving a pointer attached to the stepper motor to a pointer stop via a homing instruction;
    introducing a second delay after the moving; and
    initializing a loop counter register;
    microstepping the stepper motor towards the pointer stop two times a microstep per cycle (a sample number);
    microstepping the stepper motor one additional microstep;
    introducing a third delay;
    de-energizing the stepper motor's drive signal;
    enabling a stepper motor stall detect back electromotive force (BEMF) monitoring circuit, the BEMF monitoring circuit being configured to record the BEMF produced via the stepper motor; and
    sampling, via the BEMF monitor circuit, for a predetermined time amount and a predetermined sample amount.

8. A method for determining a zero microstep position for initializing a pointer attached to a stepper motor, comprising:

moving the pointer attached to the stepper motor in a manner that causes the pointer to compress against a pointer stop;

recording back electromotive forces (BEMF) caused by compression, iteratively performing the pointer moving one microstep further away from the pointer stop;

analyzing a specific microstep based on a lessening value of the BEMF for each iterative performance of the recordation; and calculating the zero microstep position by adding the specific microstep and a predetermined constant.

* * * * *